(12) United States Patent
Woodall et al.

(10) Patent No.: US 7,938,879 B2
(45) Date of Patent: May 10, 2011

(54) POWER GENERATION FROM SOLID ALUMINUM

(75) Inventors: Jerry M. Woodall, Westpoint, IN (US);
Eric S. Harmon, Norfolk, MA (US);
Kurt C. Koehler, Indianapolis, IN (US);
Jeffrey T. Ziebarth, Darien, IL (US);
Charles R. Allen, Lafayette, IN (US);
Yuan Zheng, West Lafayette, IN (US);
Jong-Hyeok Jeon, West Lafayette, IN (US); George H. Goble, West Lafayette, IN (US); David B. Salzman, Chevy Chase, MD (US)

(73) Assignee: Purdue Research Foundation, West Lafayette, IN (US)

( * ) Notice: Subject to any disclaimer, the term of this patent is extended or adjusted under 35 U.S.C. 154(b) by 907 days.

(21) Appl. No.: 11/747,706

(22) Filed: May 11, 2007
(Under 37 CFR 1.47)

(65) Prior Publication Data
US 2008/0056986 A1    Mar. 6, 2008

Related U.S. Application Data

(60) Provisional application No. 60/800,174, filed on May 12, 2006.

(51) Int. Cl.
*C22B 11/10* (2006.01)
(52) U.S. Cl. ............... 75/388; 75/414; 75/671; 75/688; 75/710; 420/528; 420/555; 423/657
(58) Field of Classification Search ............... 75/331, 75/388, 414, 671, 688, 710; 420/528, 555; 502/355; 423/657
See application file for complete search history.

(56) References Cited

U.S. PATENT DOCUMENTS

| | | | |
|---|---|---|---|
| 3,348,919 A | | 10/1967 | Shumway |
| 3,540,854 A | | 11/1970 | Brooke, Jr. et al. |
| 3,985,866 A | | 10/1976 | Oda et al. |
| 3,993,511 A | * | 11/1976 | Daniele ............... 117/62 |
| 4,289,744 A | | 9/1981 | Anderson |
| 4,358,291 A | | 11/1982 | Cuomo et al. |
| 4,564,509 A | * | 1/1986 | Shealy et al. ............... 423/210.5 |
| 4,745,204 A | | 5/1988 | Cuomo et al. |
| 5,170,930 A | * | 12/1992 | Dolbear et al. ............... 228/123.1 |
| 5,286,473 A | | 2/1994 | Hasebe et al. |
| 5,509,978 A | * | 4/1996 | Masumoto et al. ............... 148/403 |

(Continued)

OTHER PUBLICATIONS

STIC search.*

(Continued)

*Primary Examiner* — Jessica L Ward
*Assistant Examiner* — Paul A Wartalowicz
(74) *Attorney, Agent, or Firm* — Maginot, Moore & Beck LLP

(57) ABSTRACT

A fuel for splitting water into hydrogen and an oxide component comprises a substantially solid pellet formed from a solid-like mixture of a solid-state source material capable of oxidizing in water to form hydrogen and a passivation surface layer of the oxide component, and a passivation preventing agent that is substantially inert to water in an effective amount to prevent passivation of the solid-state material during oxidation. The pellets may be introduced into water or other suitable oxidizer in a controlled rate to control the rate of reaction of the source material with the oxidizer, and thereby control the rate of formation of hydrogen. Methods are described for producing the solid-like mixture in varying weight percent of source material to passivation preventing agent.

8 Claims, 3 Drawing Sheets

U.S. PATENT DOCUMENTS

| | | |
|---|---|---|
| 5,728,464 A | 3/1998 | Checketts |
| 5,817,157 A | 10/1998 | Checketts |
| 5,867,978 A | 2/1999 | Klanchar et al. |
| 6,322,723 B1 | 11/2001 | Thomas |
| 6,440,385 B1 | 8/2002 | Chaklader |
| 6,506,360 B1 | 1/2003 | Andersen et al. |
| 6,582,676 B2 | 6/2003 | Chaklader |
| 6,638,493 B2 | 10/2003 | Andersen et al. |
| 6,800,258 B2 | 10/2004 | Andersen et al. |
| 6,849,274 B1 | 2/2005 | Whittle |
| 6,969,417 B2 | 11/2005 | Baldwin et al. |
| 7,008,609 B2 | 3/2006 | Watanabe et al. |
| 2001/0053346 A1 | 12/2001 | Baldwin et al. |
| 2002/0048548 A1 | 4/2002 | Chaklader |
| 2003/0033991 A1 | 2/2003 | Cheng |
| 2003/0091878 A1 | 5/2003 | Rosenfeld et al. |
| 2003/0118505 A1 | 6/2003 | Andersen et al. |
| 2003/0143155 A1 | 7/2003 | Andersen et al. |
| 2004/0025808 A1 | 2/2004 | Cheng |
| 2004/0115125 A1 | 6/2004 | Andersen |
| 2004/0205997 A1 | 10/2004 | Youngblood |
| 2004/0208820 A1 | 10/2004 | Watanabe et al. |
| 2005/0232837 A1 | 10/2005 | Troczynski et al. |
| 2006/0034756 A1 | 2/2006 | Watanabe et al. |

OTHER PUBLICATIONS

Trenikhin, M.V. et al. "The Penetration of Indium-Gallium Melt Components into Aluminum." Russian Journal of Physical Chemistry, 2006, vol. 80, No. 7, pp. 1110-1114.*

The BINARY binary alloy database—listing, "SGTE BINARY free binary alloy database-List of Systems and phases", http://www.crct.polymtl.ca/FACT/documentation/BINARY/BINARY_list.htm, 21 pages, printed Sep. 14, 2007.

Al-Ga—Data from BINARY (SGTE) alloy database, http://www.crct.polymtl.ca/FACT/documentation/BINARY/Al-Ga.jpg,graph, printed, Sep. 14, 2007.

"Activation of aluminum metal to evolve hydrogen from water", A.V. Parmuzina, O.V. Kravchenko, International Journal of Hydrogen Energy, 33(2008) 3073-3076, published by Elsevier, Ltd., Apr. 2, 2008.

U.S. Appl. No. 10/935,513, filed Sep. 7, 2004, Jerry M. Woodall, Eric S. Harmon and David B. Salzman.

* cited by examiner

POWER GENERATION FROM SOLID ALUMINUM

CROSS-REFERENCE TO RELATED APPLICATIONS

The present application claims priority to co-pending provisional application No. 60/800,174, filed on May 12, 2006, with the same title, the disclosure of which is incorporated herein by reference.

BACKGROUND OF THE INVENTION

The present invention relates generally to the field of power generation, and more particularly to the use of hydrogen in power generation.

For centuries, power generation has been dominated by the use of non-renewable resources, such as coal, oil and gas. In the latter decades of the $20^{th}$ century, concerns began to mount regarding the limits to these non-renewable resources, especially oil. Some have calculated that the world oil reserves will be depleted by the year 2030, and possibly sooner as global demand for oil and its refined products increases.

Concurrent with the concerns over depletion of these power generation resources has been the growing fear of the effects of emissions not only from the use of, but also from the production of, the non-renewable resources. While the debate over the contribution of burning fossil fuels to the phenomenon of global warming rages, there is no question that the production and use of coal and oil are significant sources of air pollution.

The fear of scarcity and deleterious environmental effects has generated growing pressure to develop so-called "alternative" power or energy sources, especially from renewable sources. Thus, significant effort has gone into developing sun, wind and wave power generation systems. Thus far these renewable energy sources have been demonstrated to have value in large scale power generation, such as for supplying electricity to the grid. For obvious reasons, these renewable resources are inadequate for small power supply needs, such as to power a cell phone or run an automobile. For smaller power needs, rechargeable batteries or power cells have been developed and utilized with good success. Of course, these rechargeable electrical sources still rely upon large scale electricity generation, which is overwhelmingly coal or nuclear based.

Beginning in the last third of the $20^{th}$ century and continuing into the third millennium significant time, money and energy has been devoted to developing so-called "green" sources of power and energy that are renewable and have a much lower environmental impact than their fossil fuel cousins. One proposed solution has been to use hydrogen as a fuel. Hydrogen-fuel cell and hydrogen-internal combustion engine (ICE) technology has been successfully demonstrated for use in powering an automobile. However, many drawbacks inherent with the generation, storage and transport of hydrogen have hampered its wide-spread development and usage. One significant problem has been that it takes a significant amount of energy to extract hydrogen from water. Another problem is that room-temperature hydrogen is difficult to store since it must be strongly compressed in large, heavy pressure-safe storage tanks, or maintained in a liquefied form in cryogenically cooled tanks. In either case, the storage requirements make use of hydrogen in automobiles problematic and in much smaller apparatuses virtually unthinkable.

On the positive side, combustion of hydrogen is perhaps the most "green" power source possible. The byproduct or "exhaust" of hydrogen combustion is water and hydrogen and not the greenhouse gases that are exhausted from combustion of more traditional fuels. Thus, the environmental impact is lessened significantly and any contribution to the global warming phenomenon is nil.

There is a need for hydrogen generation systems and processes that avoid the inherent problems with current technology, namely storage and extraction. There is also a need for a hydrogen fuel cell that can be used on virtually any scale, ranging from powering an automobile to powering a small appliance, such as a cell phone.

SUMMARY OF THE INVENTION

In order to address these needs, the present invention contemplates a fuel for splitting water into hydrogen and an oxide component that comprises a substantially solid pellet formed from a solid-like mixture of a solid-state material capable of oxidizing in water to form hydrogen and a passivation surface layer of the oxide component, and a passivation preventing agent that is substantially inert to water in an effective amount to prevent passivation of the solid-state material during oxidation. In a preferred embodiment, the solid-state material is aluminum and the oxide component is aluminum oxide. The passivation preventing agent is preferably gallium.

In certain embodiments, the solid-like mixture consists essentially of between about 80% (eighty percent) and 20% (twenty percent) by weight aluminum to gallium (80/20 Al), and about 20% (twenty percent) and 80% (eighty percent) by weight aluminum to gallium (20/80 Al). Higher weight percentage aluminum content increases the water splitting component of the fuel, which increases the hydrogen production capability. On the other hand, in certain embodiments, higher weight percentage gallium content decreases the temperatures required to produce the fuel.

A process for controlled generation of hydrogen from water is contemplated in another aspect of the invention that comprises providing fuel pellets formed from a solid-like mixture of a solid-state material capable of oxidizing in water to form a passivation surface layer of the oxide component and a passivation preventing agent that is substantially inert to water. The pellets are then introduced into the water in a controlled manner to control the formation of hydrogen from the reaction of the solid-state material with water. Increasing the rate of introduction of pellets leads to a direct increase in the rate of hydrogen product. The hydrogen production can be stopped very quickly by ceasing the introduction of the fuel pellets into the water.

In a preferred embodiment of the process the solid-state material is aluminum and the passivation preventing agent is gallium. In a further embodiment, the pellets are substantially spherical with a diameter of at least 10 μm.

A process for producing an aluminum fuel in which the aluminum is capable of reacting with an oxidizer to form a passivating oxide is contemplated in another aspect of the invention. This process comprises the steps of:

(a) providing a passivation preventing agent in liquid phase;

(b) combining aluminum in solid phase with the passivation preventing agent in a mixture having a pre-determined weight percentage of passivation preventing agent and aluminum;

(c) maintaining the mixture at a temperature at or above the liquid phase temperature for aluminum at the pre-determined weight percentage of the passivation preventing agent for a time sufficient for the aluminum to dissolve into the passivation preventing agent; and (d) cooling the mixture at a controlled cooling rate to achieve a solid-like mixture.

In certain embodiments, the step of cooling the mixture is by quenching the mixture. In other embodiments, the step of cooling the mixture includes cooling the mixture to a temperature below the equilibrium line between a solid aluminum-liquid passivation preventing agent phase and a solid aluminum-solid passivation preventing agent phase. In still other embodiments, the step of cooling includes cooling the mixture to achieve a solid-like mixture that is largely free of macroscopic liquid phase of the passivation preventing agent.

A further process in accordance with the invention calls for producing an aluminum fuel in which the aluminum is capable of reacting with an oxidizer to form a passivating oxide. This process comprises the steps of:

(a) providing a passivation preventing agent in liquid phase;

(b) combining aluminum in solid phase with the passivation preventing agent in a mixture having an initial weight percentage of passivation preventing agent and aluminum;

(c) maintaining the mixture to a temperature substantially equal to the equilibrium point temperature corresponding to a desired weight percentage of the passivation preventing agent on the equilibrium line between solid phase aluminum and solid phase aluminum+liquid passivation preventing agent, for a time sufficient for the liquid passivation preventing agent to reach saturation of the aluminum; and (d) cooling the mixture at a controlled cooling rate to achieve a solid-like mixture at about the desired weight percentage of the passivation preventing agent that is largely free of macroscopic liquid phase of the passivation preventing agent.

In certain embodiments, the mixture is cooled in step (d) to a temperature at or below the equilibrium line segment between the solid aluminum phase and the solid aluminum+solid passivation preventing agent phase. In other embodiments, the cooling step (d) includes forming a slurry of liquid phase passivation preventing agent and the solid-like mixture.

It is one object of the present invention to provide a fuel that is capable of efficiently splitting water into hydrogen and an oxide. A further object resides in aspects of the fuel that allow for controlled reaction and therefore controlled production of hydrogen, on demand.

One benefit of the present invention is that it provides a fuel usable to produce hydrogen on demand and in a controlled manner. A further benefit of the invention is that it eliminates the significant problems associated with using hydrogen as a primary fuel, such as storage and extraction problems. Yet another benefit is that the inventive fuel may be efficiently produced in a substantially completely recyclable manner. Other objects and benefits of the invention will become apparent from the following written description along with the accompanying figures.

DESCRIPTION OF THE DISCLOSED EMBODIMENTS

Figure 1:
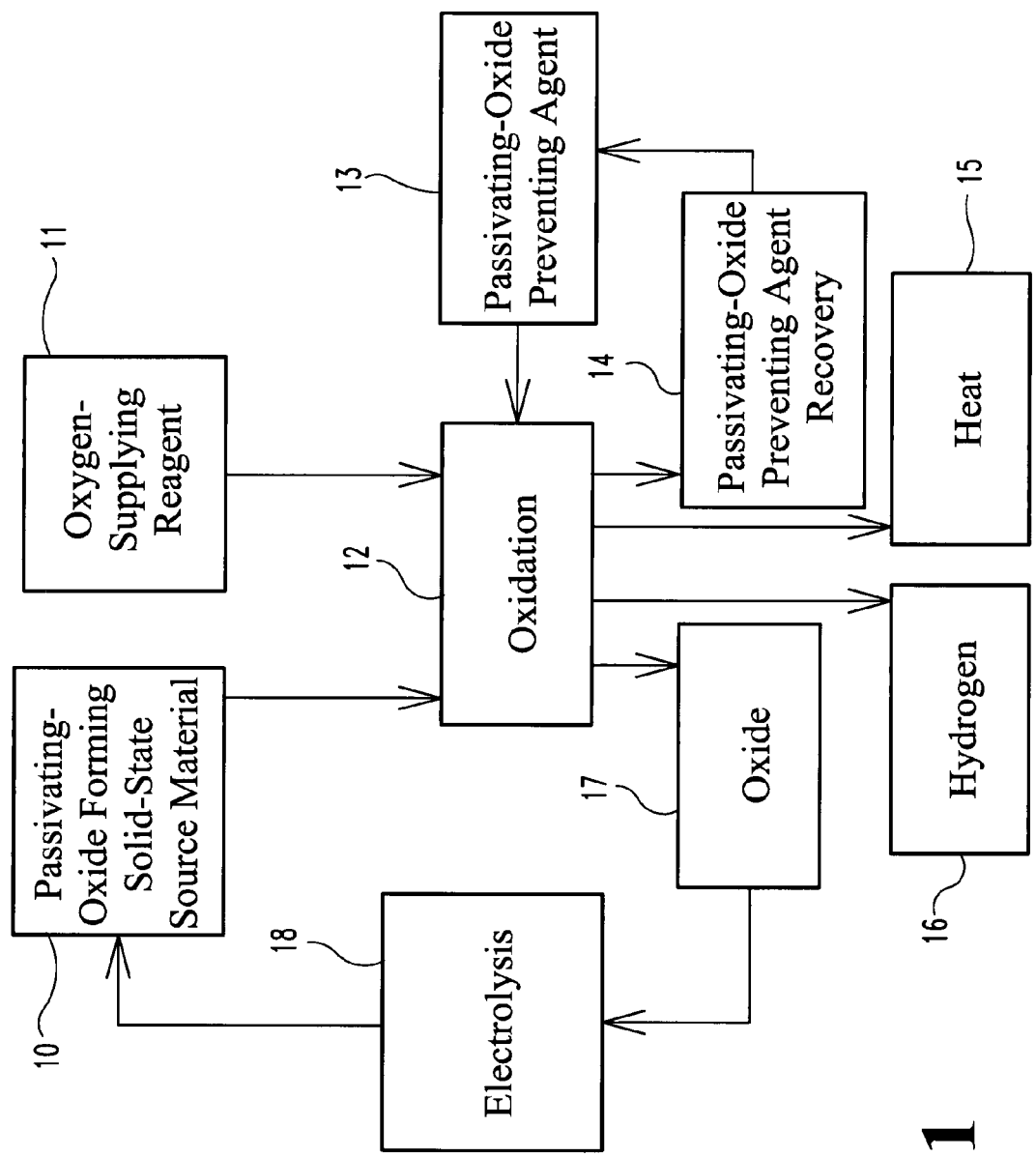
FIG. 1 is a flow chart showing a closed cycle renewable energy supply using a passivation capable solid state material, an oxidizer and a passivation preventing agent to produce hydrogen and heat.

For the purposes of promoting an understanding of the principles of the invention, reference will now be made to the embodiments illustrated in the drawings and described in the following written specification. It is understood that no limitation to the scope of the invention is intended and that any alterations and modifications to the illustrated embodiments as would normally occur to one skilled in the art to which this invention pertains are encompassed with the scope of the invention.

In a specific embodiment of the present invention, a reaction chamber or reaction engine is provided in which aluminum is reacted with water to produce hydrogen and heat. The aluminum is contained in a mixture with a passivation preventing agent so that rather than oxidize, the aluminum reacts with the water to split the water into hydrogen and aluminum oxide. The hydrogen may be provided to a power generation element, such as a combustion engine in a vehicle. More broadly, the Al—Ga to hydrogen conversion system and processes of the present invention may be combined with apparatuses that converted the hydrogen and heat into electrical, mechanical or thermal power.

The use of aluminum as a means for producing heat and hydrogen has been disclosed in U.S. Pat. No. 4,358,291, the disclosure of which is incorporated herein by reference. In particular, the '291 patent discloses hydrolyzing aluminum in the presence of liquid gallium, thereby producing aluminum oxide, hydrogen and heat. The aluminum is a material that oxidizes at low or room temperature, but forms a passivating oxide which inhibits further reaction. The gallium serves as a solvent which inhibits the passivating nature of the aluminum oxide. Gallium, gallium-indium and other suitable alloys are desirable because they become liquid at low temperatures and have a low vapor pressure, thereby allowing a wide temperature window for the aluminum oxidation reaction. Liquid gallium (or a suitable liquid gallium-indium alloy) has approximately 9 atomic percent solubility with aluminum, which allows a small fraction of the aluminum to dissolve in the solvent.

The process for controlled oxidation of the aluminum using water as the oxygen supplying reagent and gallium as the passivating oxide inhibitor, follows these reaction equations:

$$2Al + 3H_2O \rightarrow Al_2O_3 + 3H_2 + \Delta E_1 \quad \quad 1)$$

$$2H_2 + O_2 \rightarrow 2H_2O + \Delta E_2 \quad \quad 2)$$

where $\Delta E_1 = 407$ kJ/mole Al=15.1 kJ/g of aluminum, and $\Delta E_2 = 286$ kJ/mole $H_2$=429 kJ/mole Al=15.9 kJ/g of aluminum.

This process is renewable because the $Al_2O_3$ produced can be converted back into aluminum using reactions such as the following:

$$2Al_2O_3 + \Delta E_3 \rightarrow 4Al + 3O_2 \quad \quad 3)$$

$$2Al_2O_3 + 3C + \Delta E_4 \rightarrow 4Al + 3CO_2 \quad \quad 4)$$

where $\Delta E_3 = 877$ kJ/mole of Al=32.5 kJ/g of aluminum, and $\Delta E_4 = 582$ kJ/mole of Al=21.6 kJ/g of aluminum.

The energy density of aluminum as a fuel compares extremely favorably to other known technologies, as demonstrated by the following Table I:

TABLE I

| Fuel | Energy Density (kJ/g) | Engine | Efficiency (%) | Net Power (kJ/g) | Emission Products |
|---|---|---|---|---|---|
| Aluminum | 31 | Stirling or Fuel Cell | 25-50 25 | 7.8-15.5 7.8 | $Al_2O_3$ $H_2O$ |
| Gasoline | 47.5 | Internal Combustion | 20-25 | 9.5-11.9 | $CO_2$, $CO$, $NO_x$, $SO_x$, etc. |
| Methanol | 23 | Reformer + Fuel Cell | 30-40 | 6.9-9.2 | $H_2O$, $CO_2$, $CO$ |

It can first be noted that the emission products from the aluminum fuel are fully recyclable. The water may be recycled to provide additional oxidizer for the aluminum in the reaction process. The aluminum oxide is environmentally benign and readily recyclable into aluminum that can be reused to generate hydrogen. It can also be noted that in the Stirling engine the heat product of the reaction is also used in power generation. Even if only the hydrogen is used (as in the fuel cell), the resulting efficiency is still 25 percent.

Since gallium is inert, substantially all of the gallium contained in the aluminum-gallium mixture remains after the aluminum has been consumed. The gallium may be re-used and is hence nearly 100% recyclable.

As an aside, the overall efficiency of the aluminum fuel protocol should also consider the efficiency of recycling the $Al_2O_3$ back into usable aluminum. Applying Equations 3 and 4 above, the cycle efficiency ranges from 12-18 percent, where cycle efficiency is the energy generated by the oxidation of the aluminum divided by the energy required to recycle the aluminum. This cycle efficiency assumes that only 25% of the available energy of the oxidation process is captured as useful power. Obviously, if more energy is captured (such as the heat generated by the reactions in Equations 1 and 2) then the recycle efficiency will improve.

The process steps discussed in the '291 patent are illustrated in the flow chart of FIG. 1. A source of solid-state material 10 that oxidizes in the atmosphere at a low temperature, and a source of a reagent 11 that can supply oxygen for the reaction, are combined in a container 12 in the presence of an agent 13 which prevents formation of a passivating oxide on the surface of the solid-state material 10. The solid-state material 10 ordinarily forms an oxide coating upon exposure to the atmosphere, completely passivating the surface and inhibiting further oxidation. However, as disclosed in the '291 patent, at a temperature sufficient to keep the agent 13 in a liquid state, the agent dissolves a portion of the solid-state material to thereby prevent formation of the oxide. This prevention of the oxide formation permits the oxidation reaction to continue and consume more of the solid-state material 10.

Four products result from this chemical process: heat 15 and hydrogen 16 which are co-generated energy outputs; recovered agent 14 obtained from the agent 13 that is not otherwise consumed during the reaction; and an oxide reaction product 17. The reaction product 17 can be generally converted back into the solid state material 10 through an electrolysis procedure 18, which itself usually requires the application of electrical current and heat using a Hall reactor, for instance.

In one embodiment disclosed in the '291 patent, the solid-state material 10 is aluminum metal, the reagent 11 is liquid water, the agent 13 is liquid gallium and the oxide reaction product 17 is an aluminum oxide slurry.

The '291 patent discloses dissolving the aluminum in a liquid solvent, such as gallium, at room temperature. This approach has a number of drawbacks, including:

a. Limited solubility of aluminum in liquid gallium;
b. The need to keep the passivation preventing solvent in liquid form, which often necessitates the use of heating elements in the system to maintain a suitable operating temperature;
c. Separation of the aluminum and the solvent is often required to maintain control of the reaction;
d. Cost and complexity added to the system in order to maintain suitable control of the reaction;
e. The risk of hazardous spills of the solvent and/or the aluminum, particularly when the solvent is maintained at higher temperatures; and
f. The potential for the solvent to be consumed in the system due to binding of a small fraction of the solvent to the $Al_2O_3$ reaction product, so that removal of the reaction product slowly depletes the solvent, requiring periodic renewal of the solvent to maintain the system operation.

In order to avoid these drawbacks of the system proposed in the '291 patent, the present invention contemplates a solid-like mixture of solid-state oxide forming source material and the passivation preventing solvent, reaction of that solid-like mixture with an oxidizer to produce hydrogen gas, heat and an oxide of the source material, and the use of the reaction to produce useable forms of energy by conversion to electricity, mechanical energy and/or heat. In the context of the present invention, the term "solid-like mixture" means a mixture in which the oxide forming source material is in its solid-state form and the passivation preventing solvent is substantially in solid state but may have some liquid state inclusions depending upon the temperature of the mixture. This solid-like mixture is non-volatile and easy to store. The present invention contemplates one manner of storing the solid-like mixture in pellets that can be introduced into a water-filled chamber. The pellets provide a large surface area for reaction and an elegant means for controlling the rate of the reaction.

In the preferred embodiments, the solid-state oxide forming source material is solid aluminum because of its ready availability, its relatively low cost, and its ability to react vigorously at room temperature with water as the oxidizer. Water is a preferred oxidizer because it is readily available, inert and easy to obtain and store. Other solid source materials and oxidizers may be contemplated that react together. The selection of the passivation preventing agent is intertwined with the selection of the source material and the oxidizer. The agent must be able to form a solid mixture with the source material and it must be inert to the oxidizer. In the preferred embodiments, the passivation preventing agent is gallium because it is non-reactive to water as the oxidizer, it combines readily with aluminum, and it has a solid phase temperature near room temperature. Of course, if a different source material and/or oxidizer are selected, then a different passivation preventing agent may be required.

Figure 2:
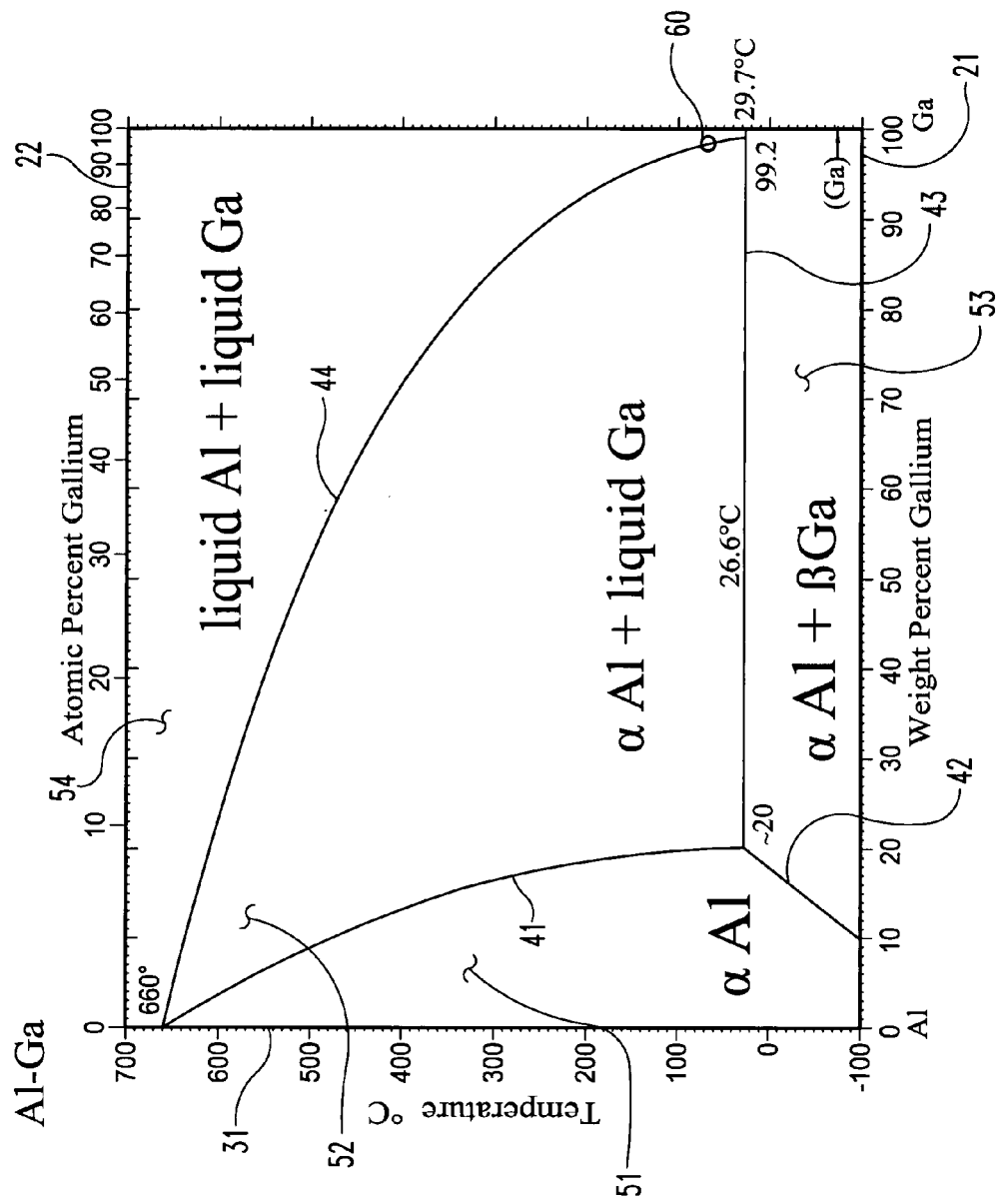
FIG. 2 is the equilibrium phase diagram for mixtures of aluminum, as the solid state material, and gallium, as the passivation preventing agent, showing an aluminum-gallium mixture disclosed in U.S. Pat. No. 4,358,291.

The equilibrium phase diagram for aluminum-gallium mixtures is shown in FIG. 2. The lower horizontal axis 21 corresponds to the weight percent of gallium in the mixture, while the upper horizontal axis 22 relates the atomic percent in the mixture. The vertical axis 31 shows the temperature in degrees Celsius. Line segments 41, 42 and 43 show the boundaries between the different solid phases in the diagram. Line segment 41 corresponds to the boundary between the equilibrium solid aluminum ($\alpha$ Al) phase in the region 51 and the equilibrium solid aluminum-liquid gallium mixture ($\alpha$ Al+liquid Ga) in region 52. Similarly, line segment 42 shows the boundary between equilibrium solid aluminum ($\alpha$ Al) phase in the region 51 and the equilibrium solid aluminum-solid gallium mixture ($\alpha$ Al+$\beta$ Ga) in region 53. Line segment 43 is at the boundary between the equilibrium solid aluminum-solid gallium mixture (α Al+β Ga) in region 53 and the equilibrium solid aluminum-liquid gallium mixture (α Al+liquid Ga) in region 52. Finally, line segment 44 defines the boundary between the equilibrium solid aluminum-liquid gallium mixture (α Al+liquid Ga) in region 52 and the equilibrium liquid aluminum-liquid gallium mixture (liquid Al+liquid Ga) in region 44. It can be appreciated that the region 52 (α Al+liquid Ga) is defined as the entire region bounded by the line segments 41, 43 and 44.

The mixture disclosed in the '291 patent generally operates using a liquid gallium phase that contains a small amount of dissolved aluminum, as represented by the point 60 in FIG. 2. In the illustrated embodiment of the '291 patent, 0.466 g Al is dissolved into 19.916 g Ga, so that the resulting solution is about 98% Ga and 2% Al. This prior mixture requires a macroscopic liquid phase of the solvent, which is used to dissolve the passivating oxide in the solid phase to thereby allow the reaction of Equation 1 to proceed until substantially all of the solid phase aluminum is consumed, the liquid phase gallium is removed, or the water is removed.

In contrast, the present invention eliminates the need for a macroscopic liquid phase of the solvent by enabling the production of a solid-like mixture of aluminum and gallium or other suitable solvent, with little or no discernable macroscopic liquid phase of the solvent. This solid-like mixture is achieved by combining a desired ratio of aluminum and gallium in an inert reaction chamber (i.e., non-reactive to either constituent) and in a low moisture inert atmosphere to insure minimal oxidation of the aluminum. Thus in certain embodiments, the reaction chamber is formed of stainless steel, while the atmosphere is a mixture of nitrogen ($N_2$) and hydrogen ($H_2$). The mixture of aluminum and gallium is heated sufficiently that the entire mixture is a liquid in region 54 of the phase diagram shown in FIG. 3. The mixture is then cooled at a controlled rate, achieving a solid-like mixture with no evidence of macroscopic liquid phase.

Figure 3:
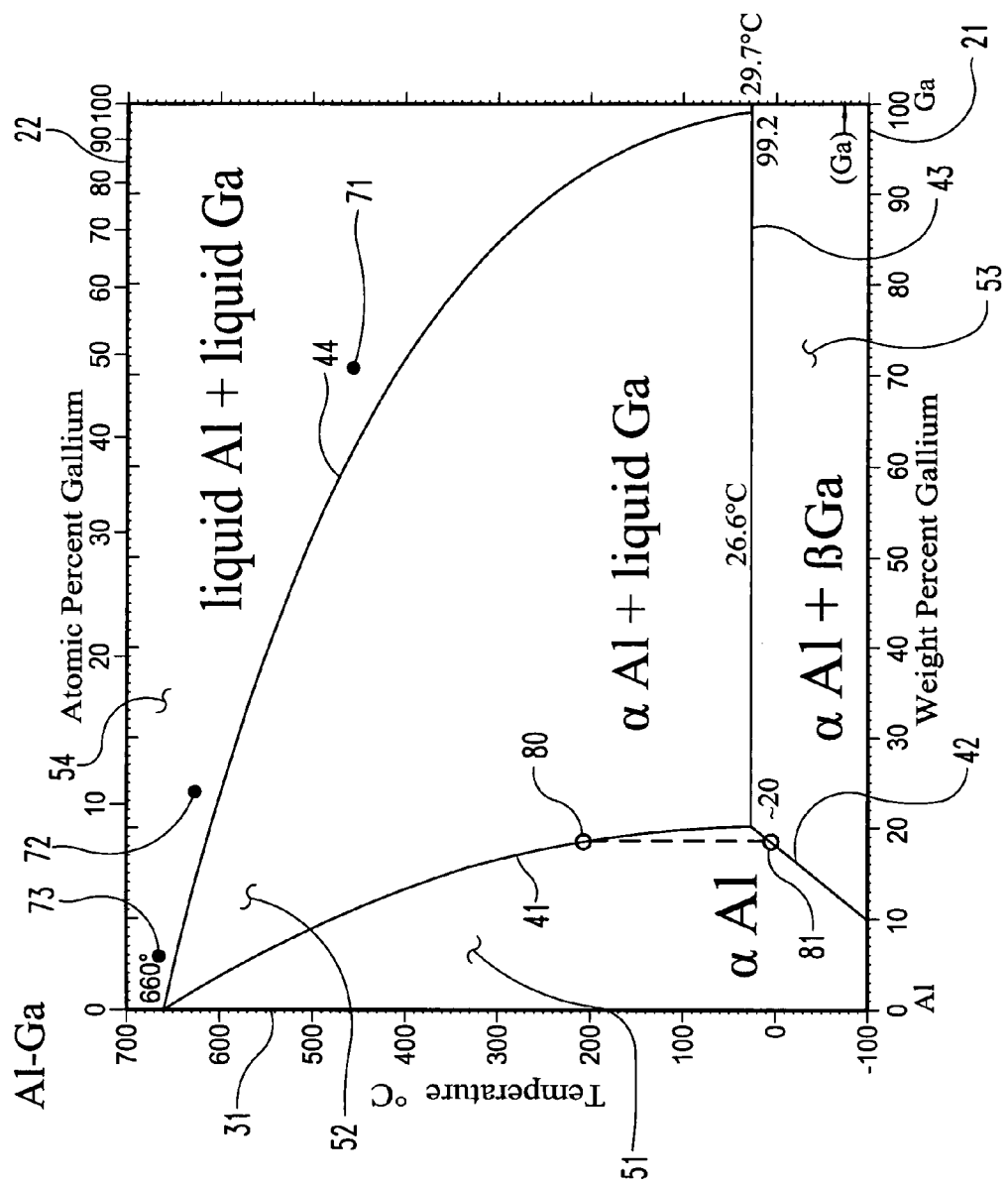
FIG. 3 is the equilibrium phase diagram of aluminum-gallium mixtures, showing mixtures in accordance with the present invention.

The equilibrium phase diagram of FIG. 3 would predict that the mixture should be a solid-liquid slush if the cooled composition is in region 52, or a solid-solid alloy if the cooled composition is in region 53. However, in accordance one feature of the present invention, the cooling profile is designed to achieve a solid-like mixture of aluminum and gallium, and in some embodiments incorporating microscopic pockets of liquid gallium inside a solid aluminum matrix to form a solid-like mixture. These microscopic pockets of liquid gallium can form voids within the aluminum, as well as coating the surfaces of grain boundaries of a solid-solid aluminum-gallium mixture. Additionally, the solid-solid aluminum-gallium mixture need not be an equilibrium solution, since quenching of the liquid-liquid aluminum-gallium mixture can achieve a non-equilibrium mixture.

In one specific example, a mixture of about 28% (twenty-eight percent) aluminum and about 72% (seventy-two percent) gallium by weight are mixed together in an inert reaction chamber at a temperature in excess of 400° C., as identified by point 71 in region 44 of the phase diagram in FIG. 3. This aluminum-gallium liquid mixture is then cooled at room temperature at a controlled cooling rate to achieve a solid-like aluminum-gallium mixture that is largely free of macroscopic liquid gallium phase and that includes a mixture of non-equilibrium aluminum-gallium solid matrix with pockets of liquid gallium.

In a more specific process, 150 g of Al pellets are placed in a stainless steel container having a volume of about 1 cup. Then 385 g of liquid gallium is poured over the aluminum. Because the aluminum is less dense than the gallium it has a tendency to float. In order to counteract this tendency, in the specific example a ½ cup stainless steel container was half filled with liquid gallium and the ½ cup container was placed inside the larger (1 cup) container so that the smaller container rests inside the larger and holds the aluminum beneath the surface of the liquid gallium. In larger scale practice it is expected that other methodologies will be created to maintain intimate contact between the constituent Al and Ga during the baking cycle, such as by continuous stirring or agitation.

The containers are placed inside a furnace and a nitrogen atmosphere is established. The furnace is operated at 450° C. for ten (10) hours. The heated composition is then cooled according to different protocols depending upon the desired final state of the mixture. In one protocol, the furnace is powered down and the mixture is cooled within the furnace as the furnace itself cools. The inert atmosphere is maintained until the mixture has reached room temperature, at which point the mixture has solidified and the aluminum is not susceptible to oxidation in a moisture-containing atmosphere. In a second protocol, the furnace is set to achieve a controlled cooling of 1° C. per minute. Again, the inert atmosphere is terminated at room temperature.

In a third protocol, the container with the mixture is removed from the furnace and the liquid mixture is quickly poured into an inert bath. In one embodiment, the bath is liquid nitrogen, while in yet another embodiment the bath is silicone oil at cryogenic temperatures. In still another embodiment, the bath is room temperature mineral oil.

The above-described process was used to produce the 28/72 mixture (i.e., 28% Al and 72% Ga) as well as 56/44 and 70/30 Al to Ga mixtures. These solid-like mixtures are non-volatile and do not react significantly with air. The resulting solid-like mixtures of the present invention are also stable and remain substantially non-volatile and non-reactive to air even at elevated temperatures approaching 100° C. This attribute makes the solid-like aluminum-gallium mixtures of the present invention very usable as a stable fuel source for power generation. To use the mixture as a fuel it is only necessary to bring the mixture into contact with a liquid oxidizer, such as water, which causes the mixture to react according to Equation 1 above. This reaction exhibits a governed rate of reaction with no flash point. If the reaction is allowed to complete the reaction products include aluminum oxide ($Al_2O_3$) powder, a liquid which is predominantly gallium (if the temperature is higher than 20° C. in accordance with the phase diagram of FIG. 3), hydrogen gas and heat.

In a preferred embodiment, the solid-like aluminum-gallium mixture is processed to take the form of pellets, preferably spherically-shaped with diameters greater than about 10 μm. The pellets may be formed using a shot tower, or other known manner for shaping solid feed material into pellets. When the pellets are dropped into a reservoir of the liquid oxidizer, the spherical shape provides a large surface area for the reaction to proceed. The rate of the reaction may be controlled by controlling the introduction of the pellets into the reservoir—i.e., the faster the pellets are introduced, the faster the rate of reaction. The reaction can be terminated almost instantaneously by ceasing the introduction of new pellets into the reservoir. It may be further contemplated that the reaction may also be controlled by controlling the flow rate of the liquid oxidizer, alone or in combination with controlled introduction of the pellets.

Although spherical pellets have been described, it should be understood that other configurations of the solid-like mixture may be desirable and may be calibrated to achieve specific control over the reaction. For instance, larger surface areas may be achieved with different shapes for the pellets. In addition, the shape and size of the pellets may be dictated by the manner or mechanism for introduction of the solid-like mixture into the liquid oxidizer. For instance, rod shaped pellets may be better suited for introduction into the reservoir, such as in the manner of control rods for nuclear reactors. In some cases, the pellets may be introduced via a carrier that supports and/or the pellets within the reservoir. In this case, the configuration of the pellets may be modified to provide a supported end while maximizing the exposed surface are for oxidation.

In one specific process, a 75/25 mixture (75% Al+25% Ga by weight) was obtained by raising the temperature of the weight percent liquid-liquid aluminum-gallium mixture above 600° C. in the inert reaction chamber, to point 72 in the equilibrium phase diagram. A controlled rate of cooling converts this equilibrium liquid-liquid solution to the solid-like mixture with little or no macroscopic liquid phase present. This embodiment advantageously reduces the amount of gallium (which is much more expensive than aluminum) required to form the final mixture, but at the cost of a higher initial mixing temperature to achieve the starting point 72 in FIG. 3.

In yet another specific alternative, the composition comprises about 95% (ninety-five percent) aluminum and about 5% (five percent) gallium by weight, as indicated by the point 73 in FIG. 3. Formation of this mixture requires a starting point temperature of about 650° C. This alternative mixture again reduces the amount of gallium required for the solid-like mixture, but at the cost of a higher initial mixing temperature. This alternative mixture pushes the solid-like solution towards the solid phase region 51 of the phase equilibrium diagram upon cooling. This specific mixture advantageously traps microscopic liquid phase gallium in the grain boundaries of the solid-solid aluminum-gallium phase, which then acts as a suitable solvent to prevent formation of the passivating oxide, ultimately enabling the solid-like mixture to continue reacting with the oxidizer until all the available aluminum is consumed.

It is of course recognized that the aluminum in the Al—Ga mixture is the fuel in the reaction of Equation 1 above. Thus, it is desirable to increase the aluminum content of the final mixture. In the specific high Al content embodiments discussed above, high process temperatures are required for the liquid-liquid phase combination of the Al and Ga. According to another embodiment of the invention, it has been discovered that high aluminum content can be achieved at significantly lower process temperatures to produce a slurry-type mixture. Thus, in this embodiment, an 80/20 mixture (80% Al and 20% Ga by weight) is achieved, as identified by point 80 in FIG. 3. In accordance with this embodiment, one process for forming the 80/20 mixture includes filling a ½ cup stainless steel container with enough liquid gallium to cover the bottom of the container. A ⅔ cup stainless steel container is filled approximately one-third full with liquid gallium. An appropriate amount of solid aluminum (as determined by the desired mixture ratio) is added to the gallium in the second container. In one specific procedure, the solid aluminum was about 10% by weight relative to the gallium. It is noted that varying the weight percent of the aluminum affects the resulting solid particle size. Higher weight percent aluminum tends to yield smaller particle sizes.

Since aluminum is buoyant in liquid gallium, the first container was placed within the larger second container on top of the aluminum-gallium composition to encourage intimate contact between the constituents. Again, as explained above, other methods may be employed to insure this intimate contact during the heating cycle. The resulting "melt apparatus" containing the solid aluminum and liquid gallium was heated to 200° C. in a known manner. In one specific embodiment, the heating step was achieved using a hotplate with the melt apparatus probed with a thermocouple to track the melt temperature. Alternatively, the melt apparatus may be placed in a furnace or oven, as discussed above. The melt apparatus was maintained at the target temperature of 200° C. for about one hour to allow the liquid gallium to reach saturation of aluminum. Since the anticipated maximum equilibrium solubility of aluminum in gallium is about 80 wt. % Al and 20 wt. % Ga, this saturation will yield the 80/20 mixture after cooling.

At the end of the heating cycle, the melt apparatus was removed from the hotplate (or furnace) and was allowed to cool to about 60° C. in preparation for the ensuing process steps. As the melt cools below this temperature, the aluminum and gallium solids spontaneously nucleate into solid particles. It is thus desirable to conduct the ensuing steps at this elevated temperature to insure that the melt will not cool below its freezing point of about 30° C. before the processing is completed. At this point, the composition includes 80/20 Al—Ga solid in liquid gallium to form a sludge. The smaller container was removed to allow access to the sludge within the larger container. The sludge is removed and placed in centrifuge tubes that have previously been purged of air and provided with an inert atmosphere. In this specific, the centrifuge tubes had a nitrogen atmosphere to keep oxygen from the melt. The tubes were placed in a centrifuge and spun at 200 rpm for about ten (10) minutes. At the end of the centrifuge cycle, the centrifuge tubes contained a powder or sandy substance on top of the bulk melt at the base of the tubes. This substance constituted the 80/20 Al composition (point 81 in FIG. 3) that was removed for used as a fuel as described above. In the specific example, a stainless steel scoop was used to extract the powder, although other means for removing the 80/20 composition may be used.

The remaining bulk melt is liquid gallium that can be used in another process. It should be appreciated that the process began with a weight percent of aluminum (10%) that yields a significantly greater weight percent of aluminum (80%) in the final solid-like mixture. Viewed from another angle, the weight percent of the gallium significantly decreases from the beginning of the process (90%) to the final product (20%). The weight of the solid aluminum remains constant throughout the process, but some portion of the weight of the gallium is contained within the solid-like mixture. The remaining gallium is in liquid form and ready for reuse in another process. By way of example, if the process began with 10 lbs. aluminum and 90 lbs. gallium (hence the 10 wt. % Al), then the final 80/20 Al product will include the 10 lbs. aluminum, but only 2.5 lbs. gallium. The remaining 87.5 lbs. of gallium is kept at the production facility and need not be transported as part of the fuel.

It was found that this 80/20 Al solid mixture reacted rapidly and robustly when immersed in the liquid oxidizer (water) bath. The power generation capability of this 80/20 mixture is about three times greater than the 28/72 mixture described above and nearly ten times greater than the solid-liquid composition disclosed in the '291 patent discussed above.

One significant benefit of the 80/20 Al solid-like mixture is that a significant amount of the gallium used in the process of forming the mixture is not retained within that mixture, as in the lower aluminum weight percent mixtures. Thus, when the mixture is formed into pellets for use as a fuel, the majority of the weight of the pellets is in the usable fuel, aluminum, rather than in the passivation inhibiting agent, gallium. The gallium used in the production process can be retained and reused at the point of production, rather than having to be extracted and recycled after use of the pellets as fuel. By way of comparison, pellets formed from the 28/72 Al mixture will have roughly three times more gallium than the 80/20 Al mixture. When the 28/72 Al pellets are spent as fuel, the gallium that comprised 72% of the weight of the pellets must be extracted from the emission products of the fuel reaction and returned to the production facility. If the pellet fuel weighs 100 lbs, the recovered gallium will weigh about 72 lbs. On the other hand, when the 80/20 Al mixture pellets are used as fuel, the gallium comprises only about 20 lbs (of a 100 lb. supply of pellets) that must be extracted from the emission products and recycled. In both cases, about the same amount of liquid gallium is used to produce the pellets, but in the case of the 28/72 Al mixture, most of the gallium weight is retained in the fuel pellets.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A process for producing an aluminum fuel in which the aluminum is capable of reacting with an oxidizer to form a passivating oxide, comprising:
   (a) providing a passivation preventing agent in liquid phase;
   (b) combining aluminum in solid phase with the passivation preventing agent in a mixture having an initial weight percentage of passivation preventing agent to aluminum;
   (c) maintaining the mixture at a temperature equal to the equilibrium point temperature corresponding to a desired weight percentage of the passivation preventing agent on the equilibrium line between solid phase aluminum and solid phase aluminum+liquid passivation preventing agent, for a time sufficient for the liquid passivation preventing agent to reach saturation of the aluminum; and
   (d) cooling the mixture at a controlled cooling rate to achieve a solid-like mixture at about the desired weight percentage of the passivation preventing agent that is largely free of macroscopic liquid phase of the passivation preventing agent.

2. The process of claim 1 wherein the mixture is cooled in step (d) to a temperature at or below the equilibrium line segment between the solid aluminum phase and the solid aluminum+solid passivation preventing agent phase.

3. The process of claim 1, wherein the desired weight percentage is less than the initial weight percentage.

4. The process of claim 3, wherein the cooling step (d) includes forming a slurry of liquid phase passivation preventing agent and the solid-like mixture.

5. The process of claim 4, further comprising:
   (e) separating the solid-like mixture from the liquid phase passivation preventing agent.

6. The process of claim 5, wherein the solid-like mixture is separated from the liquid phase passivation preventing agent by centrifugation.

7. The process of claim 5, wherein the liquid phase passivation preventing agent obtained in step (e) is recycled for use in step (a).

8. A process for producing an aluminum fuel in which the aluminum is capable of reacting with an oxidizer, comprising:
   (a) providing gallium in a liquid phase;
   (b) combining aluminum in solid phase with the liquid phase gallium in a mixture having an initial weight percentage of gallium to aluminum;
   (c) maintaining the mixture at a temperature equal to the equilibrium point temperature corresponding to a desired weight percentage of gallium on the equilibrium line between solid phase aluminum and solid phase aluminum+liquid gallium, for a time sufficient for the liquid phase gallium to reach saturation of the aluminum; and
   (d) cooling the mixture at a controlled cooling rate to achieve a solid-like mixture at about the desired weight percentage of the gallium that is largely free of macroscopic liquid phase of the gallium.

* * * * *